United States Patent [19]
Pfitzner et al.

[11] Patent Number: 6,089,548
[45] Date of Patent: Jul. 18, 2000

[54] PROCESS AND DEVICE FOR CONVERTING A LIQUID STREAM FLOW INTO A GAS STREAM FLOW

[76] Inventors: Lothar Pfitzner, Spardorfer Strasse 57, 91054 Erlangen; Heiner Ryssel, Am Veilchenberg 27, 91080 Spardorf; Piotr Strzyzewski, Stettiner Strasse 7, 91080 Uttenreuth; Georg Roeder, Mozartstrasse 63, 91052 Erlangen, all of Germany

[21] Appl. No.: 08/894,204
[22] PCT Filed: Dec. 8, 1995
[86] PCT No.: PCT/EP95/04846
 § 371 Date: Oct. 23, 1997
 § 102(e) Date: Oct. 23, 1997
[87] PCT Pub. No.: WO96/23564
 PCT Pub. Date: Aug. 8, 1996

[30] Foreign Application Priority Data

Jan. 31, 1995 [DE] Germany .......................... 195 02 944

[51] Int. Cl.⁷ .............................. B01F 3/04; B01F 11/02
[52] U.S. Cl. .......................... 261/81; 239/4; 239/102.2; 261/142; 261/DIG. 48; 438/497; 438/503
[58] Field of Search ................... 261/1, 81, 142, 261/DIG. 48, DIG. 65; 239/4, 102.2; 222/200.16; 438/497, 503; 427/444

[56] References Cited

U.S. PATENT DOCUMENTS

| | | |
|---|---|---|
| 4,719,057 | 1/1988 | Mizoguchi ................................. 261/81 |
| 4,752,422 | 6/1988 | Uchida et al. .................... 261/DIG. 65 |
| 5,176,856 | 1/1993 | Takahashi et al. ................. 261/81 X |
| 5,653,813 | 8/1997 | Benzing et al. .................... 261/142 X |
| 5,693,266 | 12/1997 | Jung ....................................... 261/81 X |
| 5,916,640 | 6/1999 | Liu et al. ............................. 427/444 X |

FOREIGN PATENT DOCUMENTS 0 559 259 A1  9/1993  European Pat. Off. .
2-238237  9/1990  Japan .............................. 261/DIG. 48
4-187922  7/1992  Japan .............................. 261/DIG. 48
4-335935  11/1992  Japan .............................. 261/DIG. 48
5-33972  2/1993  Japan .............................. 261/DIG. 48

OTHER PUBLICATIONS

Applied Physics Letters, 56 (1990) Jun. 18, No. 25., Deposition of (100) Oriented MgO Thin Films on Sapphire by a Spray Pyrolysis Method, W.J. SeSisto and R.L. Henry, pp. 2522–2523.

Patent Abstracts of Japan, vol. 14, No. 77 (C–688), Feb. 14, 1990 and JP, A, 01 294525 (TOA Nenryo Kogyo KK) Nov. 28, 1989.

Patent Abstracts of Japan, vol. 6, No. 90 (C–104) [968], May 27, 1982 and JP, A, 57 022136 (Nippon Denshin Denwa Kosha) Feb. 5, 1982.

Patent Abstracts of Japan, vol. 6, No. 226 (E–141) [1104], Nov. 11, 1982 and JP, A, 57 128035 (Hitachi Seisakusho K.K.) Aug. 9, 1982.

Patent Abstracts of Japan, vol. 9, No. 254 (C–308) [1977], Oct. 11, 1985 and JP, A, 60 108338 (Nippon Denshin Denwa Kosha) Jun. 13, 1985.

Patent Abstracts of Japan, vol. 8, No. 202 (P–300) [1639], Sep. 14, 1984 and JP, A, 59 087406 (Nippon Denshin Denwa Kosha).

Chemie–Ingenieur–Technik 52 (No. 4), pp. 304–311 (1980), Paul Schmidt and Peter Walzel.

*Primary Examiner*—Richard L. Chiesa
*Attorney, Agent, or Firm*—Dougherty & Associates

[57] ABSTRACT

In a method and an apparatus for converting a liquid flow into a gas flow, a liquid flow is introduced into an evaporation volume, the liquid flow is dispersed so as to enlarge the surface of the liquid, the dispersion being not caused by a change of pressure and taking place without admixture of a medium, and the evaporated liquid flow is conducted out of the evaporation volume.

3 Claims, 1 Drawing Sheet

PROCESS AND DEVICE FOR CONVERTING A LIQUID STREAM FLOW INTO A GAS STREAM FLOW

This application is the National Stage of International Application No. PCT/EP95/04846 filed on Dec. 8, 1995.

BACKGROUND OF THE INVENTION

1. Field of the Invention

The present invention refers to a method and an apparatus for converting a liquid flow into a gas flow and especially to a method and an apparatus for converting a liquid flow into a gas flow by means of dispersion.

2. Description of the Related Art

Various methods of converting a liquid flow into a gas flow are known. They are used e.g. in cases where liquid chemicals must be converted into the gaseous phase, e.g. when specific chemical deposition processes are carried out in the field of semiconductor technology.

The best known method for converting a liquid flow into the gaseous phase is the so-called bubbler method. This method comprises the steps of heating the liquid to be evaporated to a predetermined temperature and introducing a so-called carrier gas, e.g. nitrogen or oxygen, continuously below the surface of the liquid to be evaporated. The carrier gas bubbles rise in the liquid and are saturated with the vapour of the liquid. A mixture of vapour and carrier gas forms in a closed volume above the surface of the liquid, the mixture being discharged e.g. into a reactor connected to the volume and being then used in the above-mentioned chemical deposition processes. When an adequately low counter-pressure (e.g. reactor pressure) and a high vapour pressure of the liquid are used, a vapour stream can also be produced without a carrier gas. Depending on the vapour pressure of the liquid, this, however, requires high temperatures of the liquid.

Although the bubbler method described hereinbefore is simple with regard to the apparatus used, the control of the vapour stream is very difficult. The mass flux of the vapour/gas mixture is determined by the temperature of the liquid, the pressure above the surface of the liquid and the carrier gas flow rate. In addition, the temperature of the carrier gas and the height of the column of liquid can influence the stability and the continuity of the vapour stream. In the case of this known method, major variations of the mass flux and even a complete interruption of the mass flux caused by gas cavities may occur. In general, it is not always avantageous to admix a carrier gas for technological reasons.

Another method is based on the principle of achieving an evaporation process which is referred to as flash evaporation. Flash evaporation processes are normally used for evaporating materials with different vapour pressures. The desired composition of the gas mixture is achieved in that small amounts of the starting material, in a defined composition, are evaporated completely. In this connection, a distinction is made between the introduction of the material, the method of distributing the material to be evaporated and the heating.

An essential drawback of this method is that it is complicated and difficult to achieve a uniform distribution of the liquid in the evaporator. In the flash evaporation method, the liquid is introduced in the evaporator by means of a mass flow controller or a dosing pump. The mass flow controller supplies liquid under a very low pressure, a circumstance which makes it more difficult to distribute the liquid uniformly over the evaporator surface which is a large surface in most cases. This may give rise to temperature inhomogeneities caused by different cooling processes, and these temperature inhomogeneities result in local condensation. The dosing pump is capable of producing a high pressure, but, if the liquid contains gas cavities, this will have the effect that the liquid flow is disturbed or interrupted completely.

A further method, which is disclosed in the European patent application EP-A-0559259, is based on the principle that a liquid to be evaporated is introduced in a mixing chamber and that a carrier gas flow is simultaneously introduced in the mixing chamber in close proximity to the liquid inlet nozzle. The carrier gas flow is introduced under a pressure which is so high that a liquid/gas mixture is already generated immediately behind the liquid inlet nozzle, the liquid/gas mixture being introduced in an evaporator chamber. This evaporator chamber can have heat supplied thereto so that the liquid will evaporate and a gas mixture will form which is finally discharged from the evaporator chamber.

Other known methods are based on the principle that a liquid to be evaporated is applied to a large, heated surface so as to achieve a good heat transfer and rapid evaporation.

The publication Applied Physics Letters, Vol. 56, No. 25, pages 2522 and 2523 describes a method of spraying in the interior of a pyrolysis reactor. A liquid is supplied to an ultrasonic nozzle by means of which the liquid is atomized. The atomized liquid is entrained by a stream of oxygen.

Patent Abstracts of Japan, Vol. 14, No. 77 corresponding to JP 1294525 concerns the spraying of a solution with metal components making use of an ultrasonic spray means. From this publication it can not be inferred whether the spraying of the liquid takes place here with or without a change of pressure or whether it is carried out with or without admixture of a medium.

Patent Abstracts of Japan, Vol. 6, No. 90 corresponding to JP-A-57022136 concerns the production of optical glass fibres. A glass-forming raw material liquid is introduced in a reservoir and atomized by means of a vibration energy provided by an ultrasonic vibrator, an inert gas introduced in the reservoir conveying the material to an outlet.

SUMMARY OF THE INVENTION

It is the object of the present invention to provide a method and an apparatus for converting a liquid flow into a gas flow in the case of which control of the vapour stream formed is simple, a uniform distribution of the liquid in the evaporator is obtained, complete evaporation of the liquid is guaranteed, and disturbances or interruptions of the liquid flow are prevented.

The invention is a method of converting a liquid flow into a gas flow. The liquid flow is introduced into an evaporation volume and heat is supplied to the evaporation volume. The liquid flow is dispersed so as to enlarge the surface of the liquid, the dispersion being not caused by change of pressure, but by subjecting the liquid to a mechanical vibration, and taking place without any admixture of a medium. The evaporated liquid flow is conducted out of the evaporation volume.

The invention is an apparatus for converting a liquid flow into a gas flow. The apparatus includes an inlet means for the liquid flow, a dispersing element for dispersing the liquid flow by subjecting it to a mechanical vibration, the dispersion being not caused by a change of pressure and taking place without any admixture of a medium, a heating device by means of which an evaporation volume can be heated to a temperature depending on the liquid to be evaporated so that the dispersed liquid evaporates completely, and a discharge means.

One advantage of the present invention is that a liquid flow is converted into a gas flow in such a way that it is guaranteed that, when the liquid has been introduced, the surface of the liquid is enlarged, whereby a quick and complete evaporation is achieved subsequently so that a stable, continuous vapour/gas flow is generated.

BRIEF DESCRIPTION OF THE DRAWING

A preferred embodiment of the apparatus according to the present invention which is used for carrying out the method according to the present invention is described in detail on the basis of the figure enclosed, in which.

DESCRIPTION OF THE PREFERRED EMBODIMENTS

Figure 1:
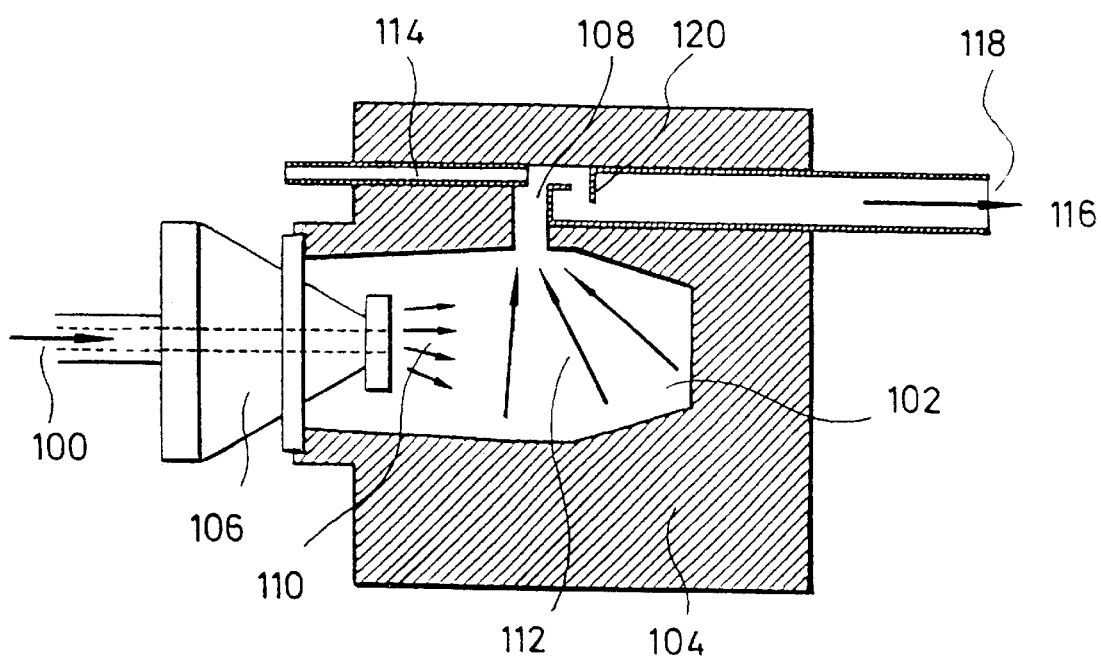
FIG. 1 shows an apparatus for converting a liquid flow into a gas flow.

Prior to describing the apparatus according to the present invention, which is used for converting a liquid flow into a gas flow, the method according to the present invention will be described hereinbelow.

In a first step, a liquid flow to be evaporated is introduced through an opening into a so-called evaporation volume. In this evaporation volume, the evaporation takes place subsequently.

In a next step, the liquid flow is dispersed, whereby the surface of the liquid is enlarged substantially. This dispersion is not caused by a change of pressure and takes place without admixing a medium. The dispersion takes therefore place with such efficiency that essentially no non-dispersed amount of liquid forms in the evaporation volume. Due to the dispersion of the liquid, the liquid evaporates quickly so that the formation of a non-dispersed amount of liquid is essentially prevented in the evaporation volume.

In a subsequent step, the evaporated liquid flow is conducted out of the evaporation volume.

For the method according to the present invention it is of essential importance that, when the liquid is being supplied, the dispersion and the evaporation take place completely and without any delay. This guarantees that the whole amount of liquid supplied is dispersed within a sufficiently short period of time, the dispersion guaranteeing that the evaporation takes place quickly.

In accordance with a preferred embodiment of the present invention, dispersion is caused by subjecting the liquid to a mechanical vibration. These mechanical vibrations can be generated e.g. by an ultrasonic transducer so that the dispersion is caused by ultrasonic waves.

In accordance with a further preferred embodiment of the present invention, the evaporated liquid flow has admixed thereto one or several carrier gases and/or process gases when it has left the evaporation volume and the resultant vapour/gas flow is discharged via an outlet.

Depending on the liquid to be evaporated, the evaporation volume can be heated to a predetermined temperature. Thermal energy is in this case supplied so quickly that no non-dispersed liquid phase forms in the evaporation volume, i.e. that a complete evaporation of the liquid flow is guaranteed.

In accordance with a further embodiment, the method according to the present invention includes a step by means of which non-evaporated amounts of liquid are held back so that it can be excluded that non-evaporated amounts of liquid reach the outlet or the outlets.

In the following, an apparatus for converting a liquid flow into a gas flow will be described in detail on the basis of FIG. 1.

An inlet means 100 is used for introducing a liquid to be evaporated into an evaporation volume 102. This evaporation volume 102 is a cavity arranged in an evaporation body 104.

A dispersing element 106 is arranged on said evaporation volume 102 in such a way that it covers said evaporation volume 102.

The dispersing element 106 disperses the liquid flow by subjecting it to a mechanical vibration, the dispersion being not caused by a change of pressure and taking place without admixture of a medium.

The apparatus according to the present invention is also provided with a discharge means 108.

In the preferred embodiment shown in FIG. 1, the dispersing element 106 includes an ultrasonic transducer so that the dispersion is caused by ultrasonic waves.

After having passed the inlet, the dispersed liquid 110 is contained in the evaporation volume 102 where it evaporates completely, i.e. it is converted into a gas flow 112.

The discharge means 108 of the embodiment according to the present invention shown in FIG. 1 includes an admixing device 114 by means of which one or several carrier gases can be admixed to the evaporated liquid flow so that a vapour/gas flow 116 is obtained, which leaves the apparatus according to the present invention via an outlet 118. The gases referred to as carrier gases hereinbelow with regard to the present invention can also participate in the process in question. Such gases are then normally referred to as process gases.

In order to prevent a discharge of non-evaporated liquid, the discharge means 108 additionally includes a device 120 which prevents precisely such discharge of non-evaporated liquid.

According to a further embodiment of the apparatus according to the present invention, which is not shown, said apparatus can additionally include a heating means with the aid of which the evaporation volume 102 can be heated to a temperature depending on the liquid to be evaporated so that a complete evaporation of the dispersed liquid 110 into a gas flow 112 will take place.

It is apparent that the present invention is not limited to an apparatus with one out outlet, but that said apparatus can, of course, be provided with one or with a plurality of outlets by means of which the resultant vapour/gas flow can be removed.

What is claimed is:

1. A method of converting a liquid flow into a gas flow in a heated evaporation cavity, comprising the following method steps:

supplying the liquid flow towards said evaporation cavity;

dispersing the liquid flow by means of ultrasonic waves so as to enlarge the surface of the liquid, said dispersion being not caused by change of pressure, but by subjecting the liquid to a mechanical vibration, and taking place without any admixture of a medium;

introducing said dispersed liquid into said evaporation cavity;

evaporating said dispersed liquid to generate a gas flow;

conducting the gas flow out of the evaporation cavity;

admixing one or several carrier gases and/or process gases to the gas flow when said gas flow has left the evaporation cavity;

conducting the resultant gas flow out of the apparatus via an outlet; and holding back non-evaporated liquid so that no non-evaporated liquid will be discharged.

2. The method according to claim 1, further comprising the following method step:

heating the evaporation cavity to a temperature depending on the liquid to be evaporated, in such a way that the dispersed liquid evaporates completely.

3. An apparatus for converting a liquid flow into a gas flow, comprising:

an inlet means for the liquid flow;

a dispersing element for dispersing the liquid flow by subjecting it to a mechanical vibration, said dispersion being not caused by a change of pressure and taking place without any admixture of a medium;

an evaporation cavity receiving said dispersed liquid;

a heating device by means of which said evaporation cavity can be heated to a temperature depending on the liquid to be evaporated so that the dispersed liquid evaporates completely; and a discharge means;

wherein the discharge means is provided with an admixing device admixing to the evaporated liquid flow one or more carrier gases and/or process gases;

wherein the discharge means is provided with a device which prevents an escape of non-evaporated liquid; and wherein the dispersing element is provided with an ultrasonic transducer.

* * * * *

UNITED STATES PATENT AND TRADEMARK OFFICE
CERTIFICATE OF CORRECTION

PATENT NO. : 6,089,548
DATED : July 18, 2000
INVENTOR(S) : Pfitzner et al.

It is certified that error appears in the above-identified patent and that said Letters Patent is hereby corrected as shown below:

On the title page, add Item [73],

ASSIGNEE:

Fraunhofer-Gesellschaft zur Förderung der angewandten Forschung e. V.
Leonrodstrasse 54, 80636 Munich
Germany Signed and Sealed this Thirty-first Day of October, 2000

Attest:

Q. TODD DICKINSON

*Attesting Officer*  *Director of Patents and Trademarks*